United States Patent
Ito et al.

(10) Patent No.: US 9,350,267 B2
(45) Date of Patent: May 24, 2016

(54) REACTOR, CONVERTER AND POWER CONVERSION DEVICE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Atsushi Ito, Yokkaichi (JP); Junji Ito, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/655,871

(22) PCT Filed: Nov. 6, 2013

(86) PCT No.: PCT/JP2013/080041
§ 371 (c)(1),
(2) Date: Jun. 26, 2015

(87) PCT Pub. No.: WO2014/103521
PCT Pub. Date: Jul. 3, 2014

(65) Prior Publication Data
US 2015/0365015 A1 Dec. 17, 2015

(30) Foreign Application Priority Data
Dec. 28, 2012 (JP) ................. 2012-288538

(51) Int. Cl.
*H01F 27/02* (2006.01)
*H02M 7/537* (2006.01)
(Continued)

(52) U.S. Cl.
CPC ............... *H02M 7/537* (2013.01); *H01F 27/02* (2013.01); *H01F 27/06* (2013.01); *H01F 27/24* (2013.01);
(Continued)

(58) Field of Classification Search
CPC .......................................... H01F 27/00–27/35
USPC ................ 336/65, 90, 92, 196, 198, 220–223
See application file for complete search history.

(56) References Cited

U.S. PATENT DOCUMENTS

| 3,543,101 | A | * | 11/1970 | Yamamoto | .............. | H01F 27/40 307/132 R |
| 2009/0144967 | A1 | * | 6/2009 | Hasu | ................... | H01F 27/2847 29/605 |
| 2013/0050952 | A1 | * | 2/2013 | Sone | ..................... | H05K 7/209 361/720 |
| 2013/0182478 | A1 | | 7/2013 | Nomura et al. | | |

(Continued)

FOREIGN PATENT DOCUMENTS

| JP | 2006-041353 A | 2/2006 |
| JP | 2010-021448 A | 1/2010 |

(Continued)

OTHER PUBLICATIONS

Feb. 10, 2014 International Search Report in International Application No. PCT/JP2013/080041.

*Primary Examiner* — Tuyen Nguyen
(74) *Attorney, Agent, or Firm* — Oliff PLC

(57) ABSTRACT

A reactor in which an assembly is easily assembled into a case and which is excellent in productivity is provided. In this reactor, two positions out of a total of four positions near opposite widthwise end parts of frame-shaped bobbins when an assembly accommodated in a case is viewed from above serve as positioning positions and the remaining two positions serve as escaping positions. At the positioning positions, projecting pieces provided on the frame-shaped bobbin are engaged with engaging grooves provided on the case. On the other hand, at the escaping positions, projecting pieces provided on the frame-shaped bobbin are allowed to escape in escaping portions (escaping grooves) provided on the case.

9 Claims, 13 Drawing Sheets

(51) Int. Cl.
*H01F 27/30* (2006.01)
*H01F 27/28* (2006.01)
*H01F 27/06* (2006.01)
*H01F 37/00* (2006.01)
*H01F 27/24* (2006.01)
*H01F 27/32* (2006.01)
*H01F 27/22* (2006.01)

(52) U.S. Cl.
CPC ............ *H01F 27/28* (2013.01); *H01F 27/2823* (2013.01); *H01F 27/30* (2013.01); *H01F 27/325* (2013.01); *H01F 37/00* (2013.01); *H01F 27/22* (2013.01)

(56) References Cited

U.S. PATENT DOCUMENTS

2014/0292456 A1* 10/2014 Suzuki .................. H01F 27/402
  336/55
2015/0130576 A1* 5/2015 Suzuki .................. H01F 41/005
  336/92

FOREIGN PATENT DOCUMENTS

| JP | 2010-262967 A | 11/2010 |
| JP | 2012-209328 A | 10/2012 |
| JP | 2013-030721 A | 2/2013 |

* cited by examiner

REACTOR, CONVERTER AND POWER CONVERSION DEVICE

CROSS-REFERENCE TO RELATED APPLICATIONS

This application is a National Stage of PCT Application No. PCT/JP2013/080041, filed 6 Nov. 2013, which claims the benefit of priority of Japanese Application No. 2012-288538, filed 28 Dec. 2012.

BACKGROUND

The present disclosure relates to a reactor used in a constituent part such as a vehicle-mounted DC-DC converter or a power conversion device mounted in a vehicle such as a hybrid vehicle, a converter with a reactor and a power conversion device with a converter.

Reactors and motors with magnetic parts including a coil with a coil element formed by winding a winding wire and a magnetic core to be partly inserted into the coil element are generally known. In particular, as shown in Japanese Unexamined Patent Publication No. 2006-41353, a reactor having this type of magnetic core has been used in a circuit part of a converter mounted in a vehicle such as a hybrid vehicle. This reactor is configured such that an assembly of a coil with a pair of coil elements arranged in parallel and an annular magnetic core inserted into both coil elements is accommodated in a case. The assembly accommodated in the case of Japanese Unexamined Patent Publication No. 2006-41353 is provided with a frame-shaped bobbin for ensuring insulation between the coil and the magnetic core by being held in contact with an end surface of the coil (i.e., axial end surfaces of the coil elements).

Unlike the reactor of Japanese Unexamined Patent Publication No. 2006-41353, some reactors use a coil with only one coil element. For example, a reactor in which a magnetic core is configured by combining two substantially E-shaped divided cores or combining a substantially E-shaped divided core and a substantially I-shaped divided core. In such a case, a projecting part in the middle of an E-shape is inserted into the coil (i.e., into the coil element). Also in this mode, a frame-shaped bobbin (for ensuring insulation between the coil and the magnetic core by being held in contact with an end surface of the coil) may be used in some cases.

SUMMARY

However, conventional reactors, such as discussed above in Japanese Unexamined Patent Publication No. 2006-41353, require an operation of arranging the assembly at a predetermined position in the case in an assembling procedure thereof. In particular, to position the assembly in this case, the bobbin is caused to bulge out in a parallel direction of the coil elements and grooves to be engaged with the bulging parts (bulging portions) are formed on the case.

However, since the bulging portions of the bobbin and the grooves of the case of the reactor of Japanese Unexamined Patent Publication No. 2006-41353 are engaged at a total of four positions, the bulging portions and the grooves have to be positioned at all four positions to accommodate the assembly into the case. This positioning is more difficult as the bulging portions and the grooves are more tightly engaged (i.e., a difference between a width of the bulging portions and a groove width becomes smaller), which may reduce the productivity of the reactor.

In view of the above situation, the present disclosure describes a reactor in which an assembly is easily assembled into a case and which is excellent in productivity. The present disclosure also describes a converter using the reactor and a power conversion device using that converter.

According to a first embodiment, a reactor includes a coil including a coil element formed by winding a winding wire, a magnetic core including a part to be inserted into the coil element, a pair of frame-shaped bobbins respectively provided on opposite axial ends of the coil element, and a case for accommodating an assembly of the coil, the magnetic core and the pair of frame-shaped bobbins. In this reactor of the first embodiment, two positions out of a total of four positions near opposite widthwise end parts of one frame-shaped bobbin and near opposite widthwise end parts of the other frame-shaped bobbin when the assembly accommodated in the case is viewed from above serve as positioning positions for determining the position of the assembly in the case and the remaining two positions serve as escaping positions. In this reactor of the first embodiment, projecting pieces are respectively provided at the four positions (two positioning positions and two escaping positions) on either the frame-shaped bobbins or the case, and engaging grooves to be engaged with the projecting pieces are respectively provided at the positioning positions and escaping portions for allowing the projecting pieces to escape are respectively provided at the escaping positions on the other of the frame-shaped bobbins and the case. The reactor of the first embodiment has an advantage of being excellent in productivity because an operation of arranging the assembly at a predetermined position in the case is easily performed.

According to the first embodiment, a reactor includes a coil including a coil element formed by winding a winding wire, a magnetic core including a part to be inserted into the coil element, a pair of frame-shaped bobbins respectively provided on opposite axial ends of the coil element, and a case for accommodating an assembly of the coil, the magnetic core and the pair of frame-shaped bobbins. In this reactor of the first embodiment, two positions out of a total of four positions near opposite widthwise end parts of one frame-shaped bobbin and near opposite widthwise end parts of the other frame-shaped bobbin (when the assembly accommodated in the case is viewed from above) serve as positioning positions for determining the position of the assembly in the case and the remaining two positions serve as escaping positions. In this reactor of the first embodiment, projecting pieces are respectively provided at the four positions (two positioning positions and two escaping positions) on either the frame-shaped bobbins or the case, and engaging grooves to be engaged with the projecting pieces are respectively provided at the positioning positions and escaping portions for allowing the projecting pieces to escape are respectively provided at the escaping positions on the other of the frame-shaped bobbins and the case.

Effect of the Reactor of the First Embodiment

The reactor of the first embodiment has an advantage over conventional reactors (e.g., the reactor of Japanese Unexamined Patent Publication No. 2006-41353) in increasing efficiency in assembling the reactor as the operation of arranging the assembly at a predetermined position in the case is easily performed.

BRIEF DESCRIPTION OF THE DRAWINGS

Exemplary embodiments will be described with reference to the following drawings.

DETAILED DESCRIPTION OF EXEMPLARY EMBODIMENTS

Figure 1:
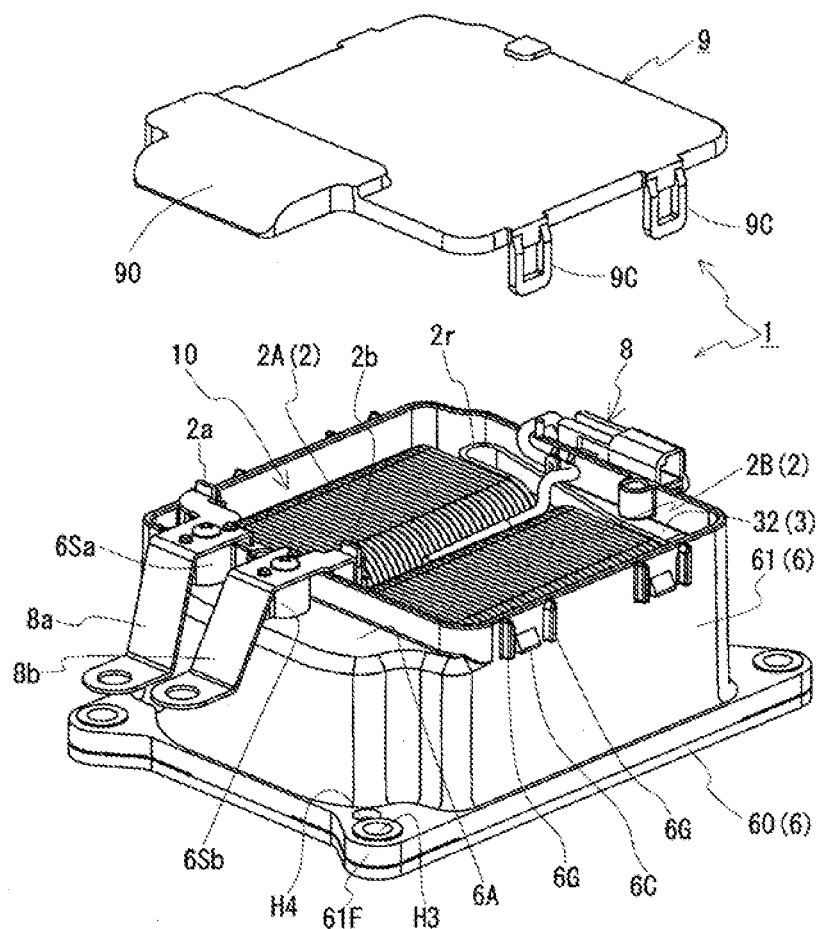
FIG. 1 shows a perspective view of a reactor of a first embodiment.
Figure 2:
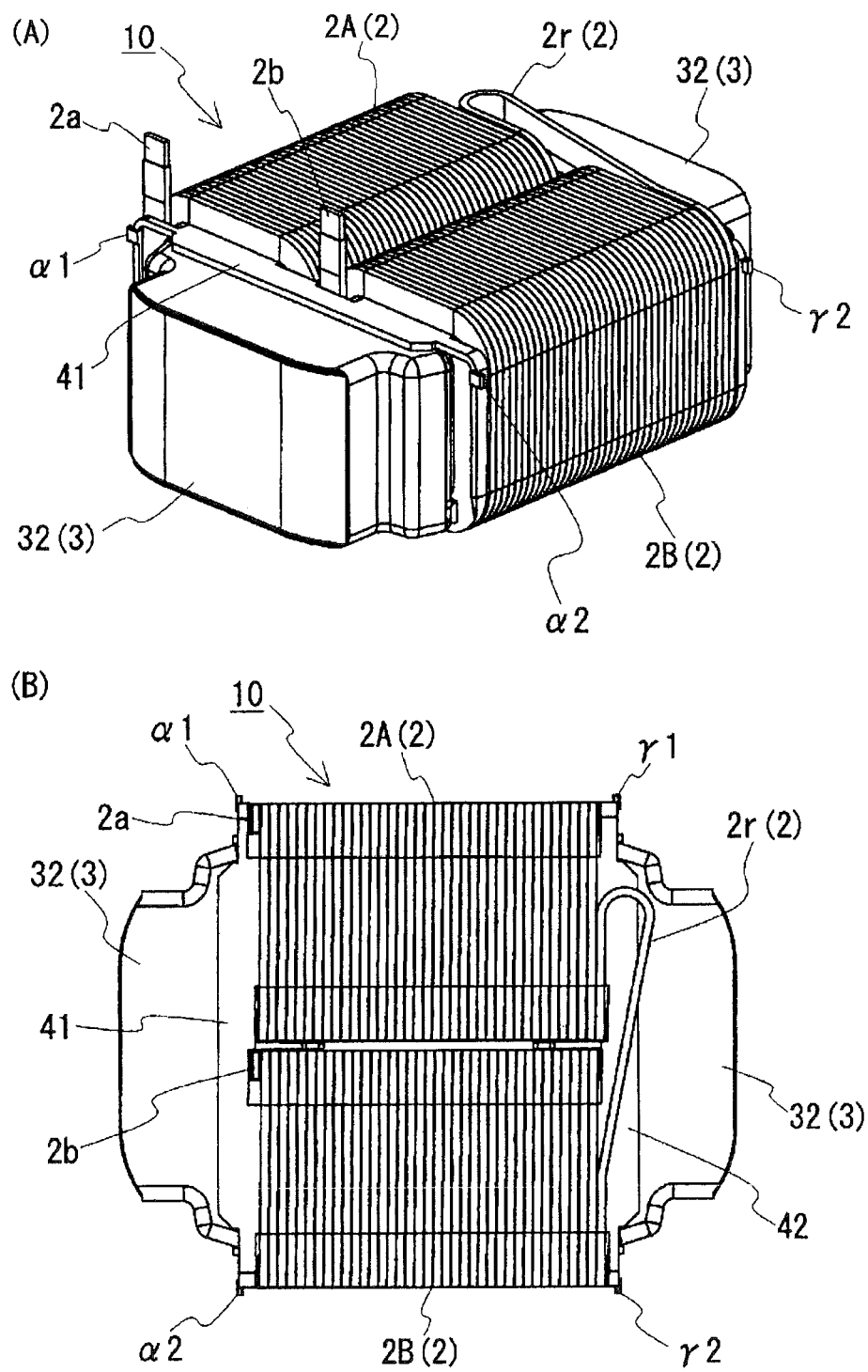
FIG. 2(A) shows a perspective view of an assembly provided in the reactor of the first embodiment and FIG. 2(B) shows a top view of the assembly provided in the reactor of the first embodiment.

First, contents of an embodiment of the present embodiment are listed and described.

<1> A reactor of the first embodiment includes a coil with a coil element formed by winding a winding wire, a magnetic core with a part to be inserted into the coil element, a pair of frame-shaped bobbins respectively provided on opposite axial ends of the coil element and a case for accommodating an assembly of the coil, the magnetic core and the pair of frame-shaped bobbins. In the reactor of this embodiment, out of a total of four positions near opposite widthwise end parts of one frame-shaped bobbin and opposite widthwise end parts of the other frame-shaped bobbin (when the assembly accommodated in the case is viewed from above) two positions may serve as positioning positions for determining the position of the assembly in the case and the remaining two positions may serve as escaping positions. In the reactor of this embodiment, projecting pieces may be respectively provided at the above four positions (two positioning positions and two escaping positions) on either the frame-shaped bobbins or the case, and engaging grooves to be engaged with the projecting pieces are respectively provided at the positioning positions and escaping portions for allowing the projecting pieces to escape are respectively provided at the escaping positions on the other of the frame-shaped bobbins and the case.

In this embodiment, by setting two positioning positions and two escaping positions in the reactor, it is sufficient to position the case and the assembly substantially at two positioning positions in arranging the assembly in the case and the assembly can be easily arranged in the case. Thus, the reactor of this embodiment can be manufactured with good productivity.

In other words, the positioning position may be a position where the position of the frame-shaped bobbin with respect to the case is determined in both a coil axis direction and a coil width direction (direction perpendicular to the coil axis direction when the assembly in the case is viewed from above). On the other hand, the escaping position may be a position where at least one of the position of the frame-shaped bobbin with respect to the case in the coil axis direction and that in the coil width direction is not necessarily determined during arrangement of the assembly in the case.

<2> In some embodiments, the projecting pieces may be provided on the frame-shaped bobbins because it may be easier to form the projecting pieces on the frame-shaped bobbins than to form the engaging grooves on the frame-shaped bobbins. This is because the frame-shaped bobbins may be in the form of flat plates. Further, it may be easier to form the engaging grooves on the case than to form the projecting pieces on the case. This is because the engaging grooves can be formed on the case by grooving the existing case. In addition, in the case of providing a total of four projecting pieces on the frame-shaped bobbins in the reactor, two projecting pieces are provided on each frame-shaped bobbin and the pair of frame-shaped bobbins provided in the reactor can be formed into the same shape. As a result, the productivity of the frame-shaped bobbins, and consequently that of the reactor can be improved.

<3> In another embodiment, two positioning positions may both be provided on one side in an axial direction of the coil element. The magnetic core provided in the reactor is often formed by combining a plurality of core pieces. In such a case, there may be a dimensional error in a length of the magnetic core in the coil axis direction, depending on a joined state of the core pieces. Thus, if the two positioning positions are provided at positions distant in the coil axis direction, an error is also likely to occur in an engaged state of the projecting pieces and the engaging grooves at both positioning positions and it may become difficult to arrange the assembly in the case. Contrarily, an error hardly occurs in the engaged state of the projecting pieces and the engaging grooves at both positioning positions by eccentrically providing the two positioning positions on one side in the coil axis direction, wherefore there is no fear of making the arrangement of the assembly in the case difficult.

<4> In another embodiment, the two positioning positions may both be provided on a side, where an end part of the winding wire constituting the coil element is arranged, in the axial direction of the coil element. A terminal member for electrically connecting the reactor to an external device may be mounted on the end part of the winding wire (end part of the coil element). Since the terminal member is mounted after the assembly is arranged in the case, there is a need to accurately arrange a terminal of the coil element at a predetermined position in the case. By arranging the two positioning positions on the end part of the coil element in the coil axis direction in response to such a need, the end part of the coil element can be accurately positioned at the predetermined position in the case.

<5> In another embodiment, the projecting pieces may project in the coil width direction perpendicular to the axial direction of the coil element when the reactor is viewed from above. Due to the structures of the frame-shaped bobbins and the case, it is easier to manufacture in a state where the projecting pieces project in the coil width direction than in a state where the projecting pieces project in another direction. Further, the reason why it is easier to manufacture in the state where the projecting pieces project in the coil width direction is that the frame-shaped bobbins and the case are close in distance in the coil width direction due to the structures of the frame-shaped bobbins and the case. Further, by causing the projecting pieces to project in the coil width direction, both the position of the assembly in the coil axis direction and that in the coil width direction in the case may be accurately determined.

<6> In another embodiment, a groove width of the engaging groove on a side serving as an insertion opening for the projecting piece in accommodating the assembly into the case may gradually widen toward the insertion opening.

The projecting piece in this embodiment may be easily fitted into the engaging groove since the groove width of a part of the engaging groove serving as the insertion opening for the projecting piece is widened.

<7> In another embodiment, the escaping portions may be escaping grooves for allowing the projecting pieces to escape.

In this embodiment, to allow the projecting piece to escape by the escaping groove, a groove width of the escaping groove may be set so that a clearance between the escaping groove and the projecting piece in a groove width direction is larger than a clearance between the engaging groove and the projecting piece in the groove width direction.

<8> The above reactor of the first embodiment may be preferably used as a constituent part of a converter. Specifically, a converter of the first embodiment includes the reactor of the first embodiment. For example, a configuration including a switching element, a driving circuit for controlling the operation of the switching element and the reactor of the embodiment for making a switching operation smooth and designed to convert an input voltage by the operation of the above switching element may be, for example, provided as the converter of the first embodiment.

The converter of the first embodiment using the reactor of the first embodiment is excellent in productivity and contributes to an improvement in the productivity of an apparatus (e.g., a vehicle such as a hybrid vehicle) provided with the converter of the embodiment.

<9> The above converter of the first embodiment may be preferably used as a constituent part of a power conversion device. Specifically, a power conversion device of the first embodiment includes the converter of the first embodiment. For example, a configuration including the converter of the first embodiment for converting an input voltage and an inverter connected to the above converter for converting a direct current into an alternating current and vice versa and designed to drive a load by power converted by this inverter may be provided as the power conversion device of the first embodiment.

The power conversion device of the first embodiment using the reactor of the first embodiment is excellent in productivity and contributes to an improvement in the productivity of an apparatus (e.g., a vehicle such as a hybrid vehicle) provided with the power conversion device of the first embodiment.

Hereinafter, embodiments of a reactor provided positioning positions and escaping positions are described based on the drawings. The same reference signs in the drawings denote the same components.

<First Embodiment>
<<Overall Configuration>>

Figure 3:
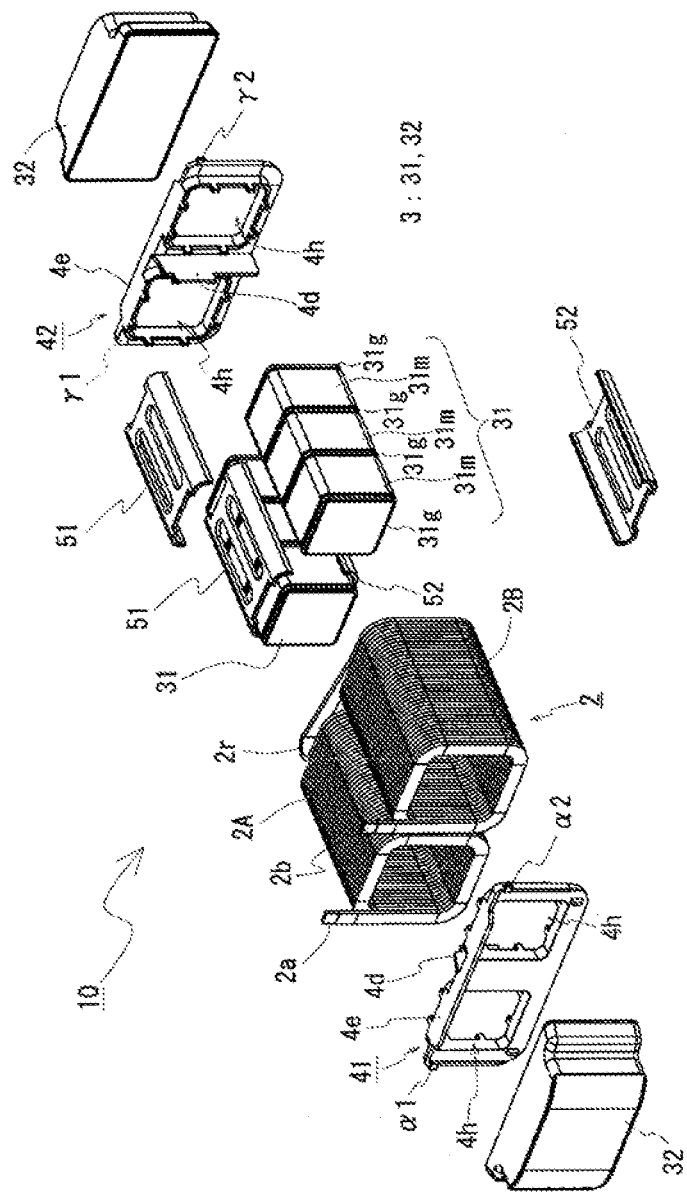
FIG. 3 shows an exploded perspective view of the assembly provided in the reactor of the first embodiment.
Figure 4:
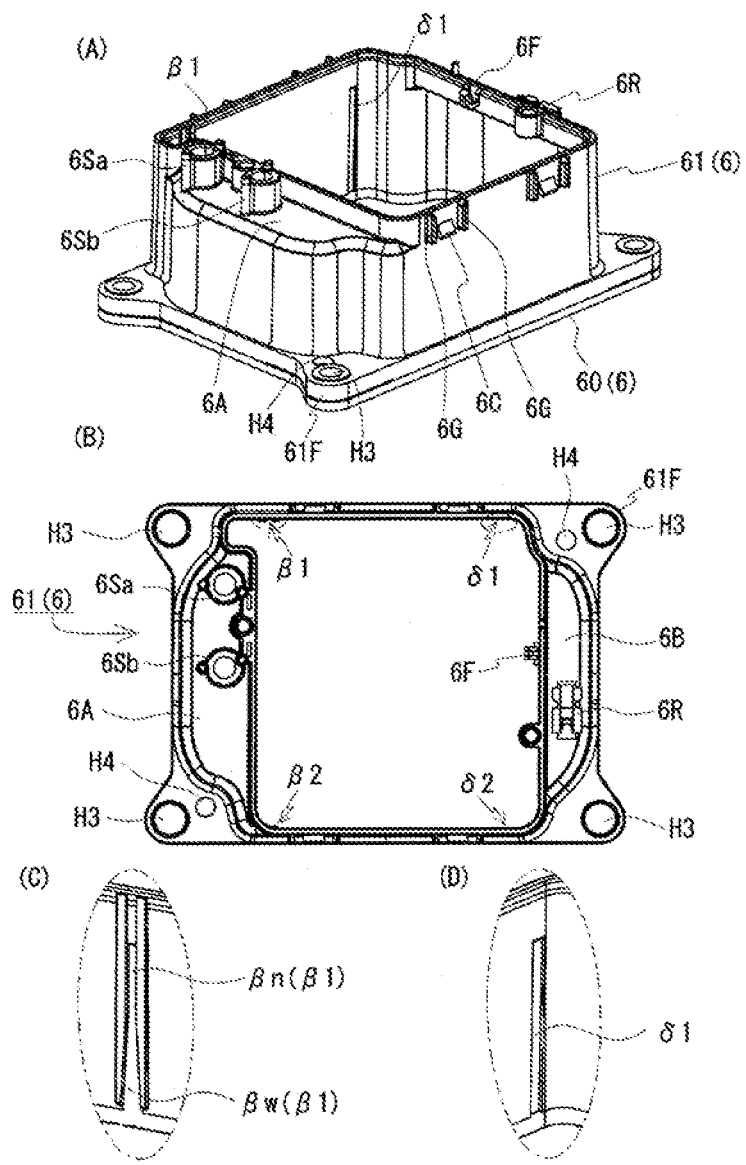
FIG. 4(A) shows a perspective view of a case provided in the reactor of the first embodiment.
FIG. 4(B) shows a top view of a side wall portion as a part of the case provided in the reactor of the first embodiment.
FIG. 4(C) shows a partial enlarged view of the vicinity of a case-side engaging portion of the side wall portion (as a part of the case provided in the reactor of the first embodiment).
FIG. 4(D) shows a partial enlarged view of the vicinity of a case-side loosely fitting portion of the side wall portion (as a part of the case provided in the reactor of the first embodiment).
Figure 5:
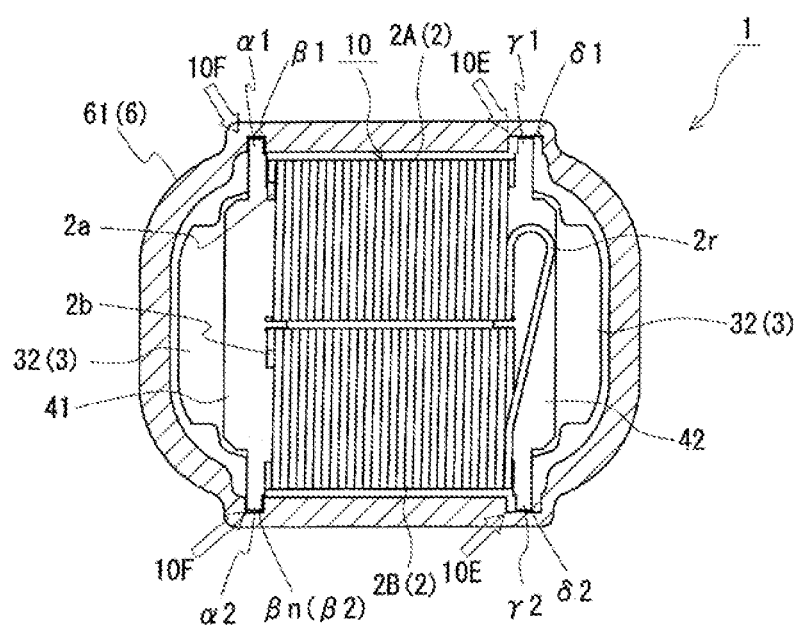
FIG. 5 shows a diagram showing an engaged state of the case and frame-shaped bobbins of the assembly in the first embodiment.

FIGS. 1-6 show a reactor 1 according to a first embodiment. The reactor 1 of the first embodiment shown in FIG. 1 is so configured that an assembly 10 formed by combining a coil 2, a magnetic core 3 and a pair of frame-shaped bobbins 41, 42 (shown in FIGS. 2A-3, 5 and 6) is accommodated in a case 6 and an opening of the case 6 is closed by a lid 9 (a state where the lid 9 is removed is shown in FIG. 1). In reactor 1 of the first embodiment, out of four positions near opposite widthwise end parts of one frame-shaped bobbin 41 and near those of the other frame-shaped bobbin 42 when the assembly 10 accommodated in the case 6 is viewed from above, two positions serve as positioning positions 10F for determining the position of the assembly 10 in the case 6 and the remaining two positions serve as escaping positions 10E as shown in FIG. 5. Each component of the reactor 1 of the embodiment is described in detail below.

Note that, in the following description, a direction parallel to an axis of the coil 2 (coil elements 2A, 2B) is referred to as a coil axis direction and a direction perpendicular to the coil axis direction when the reactor 1 is viewed from above is referred to as a coil width direction.

[Assembly]

Out of the assembly 10, the forms of the coil 2 and the magnetic core 3 are not particularly limited. For example, as shown in the perspective view of FIG. 2(A), the top view of FIG. 2(B) and the exploded perspective view of FIG. 3, the coil 2 in the first embodiment is such that a pair of coil elements 2A, 2B formed by winding a winding wire are linked by a coupling portion 2r, and the magnetic core 3 is an annular magnetic core including inner core portions 31 (see FIG. 3) to be inserted into the coil elements 2A, 2B and outer core portions 32 exposed from the coil elements 2A, 2B. This assembly 10 further includes inner bobbins 51, 52 (see FIG. 3) interposed between the outer peripheral surfaces of the inner core portions 31 and the inner peripheral surfaces of the coil elements 2A, 2B, a frame-shaped bobbin 41 interposed between one axial end surface of each of the coil elements 2A, 2B and the outer core portion 32, and a frame-shaped bobbin 42 interposed between the other axial end surface of each of the coil elements 2A, 2B and the outer core portion 32. The frame-shaped bobbins 41, 42 relating to the characteristic of the embodiment are described below. The components other than the frame-shaped bobbins 41, 42 are described in a method for manufacturing the reactor 1 later below.

(Frame-Shaped Bobbins)

In the first embodiment, the frame-shaped bobbin 41 provided on a side in the coil axis direction where end parts 2a, 2b of the winding wires constituting the coil elements 2A, 2B are arranged and the frame-shaped bobbin 42 provided on a side in the coil axis direction where the coupling portion 2r is provided may be identically shaped. By making both frame-shaped bobbins 41, 42 exactly the same, the productivity of the frame-shaped bobbins 41, 42 can be improved and, consequently, the productivity of the reactor can be improved.

The frame-shaped bobbin 41 includes two projecting pieces (bobbin-side engaging portions) provided in a coil width direction (same as a parallel direction of the coil elements 2A, 2B). More specifically, when the assembly 10 is viewed from above, the projecting pieces α1, α2 are provided on one and the other end parts of the frame-shaped bobbin 41. These projecting pieces α1, α2 are engaged with engaging grooves (case-side engaging portions) β1, β2 of the case 6 to be described later (see FIG. 4(A)-(C)) to constitute the positioning positions 10F (see FIG. 5).

On the other hand, as shown in FIGS. 2(A) and (B), 3 and 5, the frame-shaped bobbin 42 includes two projecting pieces (bobbin-side loosely fitting portions) γ1, γ2 separated in the coil width direction. More specifically, when the assembly 10 is viewed from above, the projecting pieces γ1, γ2 are provided on one and the other end parts of the frame-shaped bobbin 42. These projecting pieces γ1, γ2 are arranged in escaping grooves (case-side loosely fitting portions) 81, 82 of the case 6 to be described later (see FIG. 4(A), (B) and (D)) to constitute the escaping positions 10E (see FIG. 5). That is, the projecting pieces γ1, γ2 of the frame-shaped bobbin 42 have the same shape as the projecting pieces α1, α2, but have a different function.

Next, the shape and formation positions of the projecting pieces α1, α2 (projecting pieces γ1, γ2) are described. Note that since the shape and formation positions of the projecting pieces α1, α2 are the same as those of the projecting pieces γ1, γ2, the projecting pieces α1, α2 are described as representatives.

The projecting pieces α1, α2 in this embodiment are projections having a rectangular cross-sectional shape in a thickness direction of the frame-shaped bobbin 41. This cross-sectional shape is not particularly limited and may be, for example, one of elliptical shapes including circular shapes, one of polygonal shapes other than rectangular shapes such as triangular shapes and trapezoidal shapes or one of irregular shapes such as hook shapes. Particularly, in view of easiness to form, the cross-sectional shape is preferably rectangular, triangular or trapezoidal.

A projecting direction of the projecting pieces α1, α2 in this embodiment is the coil width direction (i.e., a lateral direction of the frame-shaped bobbin 41). This projecting direction is also not particularly limited and may be, for example, the coil axis direction or a direction intersecting with both the coil axis direction and the coil width direction. Particularly, the projecting direction of the projecting pieces α1, α2 is preferably the coil width direction as in this embodiment. This is because projection in the coil width direction has an advantage of being easy to form the projecting pieces α1, α2 and an advantage of being easy to engage the case 6 (see FIG. 1) located lateral to the frame-shaped bobbin 41.

The formation positions of the projecting pieces α1, α2 in this embodiment are on an upper end side of the frame-shaped bobbin 41 in a height direction (vertical direction in the figure planes which is the same as a height direction of the reactor 1 of FIG. 1). The formation positions of the projecting pieces α1, α2 are determined in correspondence with engaging grooves β1, β2 (see FIG. 4(C)) to be described later. If the shape of the engaging grooves β1, β2 is changed, the formation positions of the projecting pieces α1, α2 can be also changed in accordance with the changed shape. For example, if the engaging grooves β1, β2 are located only on a lower side in the height direction of the reactor, the formation positions of the projecting pieces α1, α2 may be on a lower end side of the frame-shaped bobbin 41 in the height direction. Note that the projecting pieces may also be elongated projections extending in the height direction of the frame-shaped bobbin 41 (same as a height direction of the assembly 10). Besides, lateral edge parts of the frame-shaped bobbin 41 may be used as the projecting pieces.

The size of the projecting pieces α1, α2 is not particularly limited if predetermined strength can be ensured. However, preferably, the projecting pieces α1, α2 do not protrude from the frame-shaped bobbin 41 in the width and height directions. Here, a width of the projecting pieces α1, α2 is a length of the projecting pieces α1, α2 in a direction perpendicular to the projecting direction of the projecting pieces α1, α2 (thickness direction of the frame-shaped bobbin 41 in this embodiment) when the assembly 10 is viewed from above. Further, a height of the projecting pieces α1, α2 is a length of the projecting pieces α1, α2 in the height direction of the assembly 10.

[Case]

The case 6 is a box-shaped member capable of accommodating the assembly 10 inside (see FIG. 1). The case 6 of this embodiment may be composed of a bottom plate portion 60 on which the assembly 10 is to be placed, and a side wall portion 61 fabricated separately from the bottom plate portion 60 and to be mounted on the bottom plate portion 60 later. Note that the case may be configured such that the bottom plate portion and the side wall portion are integrally formed as shown in a fifth embodiment to be described later.

As shown in FIG. 4(B), the side wall portion 61 of the case 6 is formed with two engaging grooves β1, β2 and two escaping grooves (a form of escaping portions) δ1, δ2. The engaging grooves β1, β2 and the escaping grooves δ1, δ2 are respectively formed at positions corresponding to the projecting pieces α1, α2 of the frame-shaped bobbin 41 and the projecting pieces γ1, γ2 of the frame-shaped bobbin 42 shown in FIG. 3. The shapes of the engaging grooves β1, β2 and the escaping grooves δ1, δ2 are described with reference to FIG. 4 and an engaged state of the engaging grooves β1, β2 and the projecting pieces α1, α2 and an engaged state of the escaping grooves δ1, δ2 and the projecting pieces α1, α2 are appropriately described with reference to a diagram of FIG. 5. Note that, in FIG. 5, the frame-shaped bobbins 41, 42, the case 6 and the engaged states are shown in a more exaggerated manner than actual dimensions (this point holds true also in FIGS. 7 to 9 to be described later).

(Engaging Grooves)

The engaging groove β1 (also the engaging groove β2) extends upward from the lower end of the side wall portion 61 as shown in FIG. 4(C). The engaging groove β1 is composed of a narrow portion βn located on an upper side of the side wall portion 61 (i.e., upper side of the reactor 1) and a wide portion βw located on a lower side of the side wall portion 61 (i.e., lower side of the reactor 1). The engaging groove β1 can be formed by partly thickening the side wall portion 61 and shaving a central part of the thickened part. A shaving depth is larger than a projecting distance of the thickened part.

The narrow portions βn are parts with which the projecting pieces α1, α2 of the frame-shaped bobbin 41 are engaged when the assembly 10 is arranged in the case 6. A contour line of the narrow portion βn when the side wall portion 61 is cut in a direction perpendicular to an extending direction of the engaging grooves β1, β2 is substantially similar to contour lines of cross-sections of the projecting pieces α1, α2.

A groove width of the narrow portions Pn is equal to the width of the projecting pieces α1, α2 or larger than the width of the projecting pieces α1, α2 by less than 1 mm (see also FIG. 5). By forming the narrow portions βn having such a groove width, the position of the assembly 10 in the case 6 in the coil axis direction can be determined at the positioning positions 10F (see also FIG. 5). Note that since it becomes more difficult to arrange the projecting pieces α1, α2 in the narrow portions Pn as a difference between the groove width of the narrow portions βn and the width of the projecting pieces α1, α2 becomes smaller, that difference is preferably about 0.5 mm.

A groove depth of the narrow portions βn is so set that tip parts of the projecting pieces α1, α2 arranged in the narrow portions βn are in contact with groove bottoms of the narrow portions βn when the assembly 10 is arranged in the case 6 or so set that the tip parts of the projecting pieces α1, α2 are separated from the groove bottoms of the narrow portions βn by less than about 1 mm (see also FIG. 5) when the assembly 10 is arranged in the case 6. By forming the narrow portions Pn having such a groove depth, the position of the assembly 10 in the coil width direction in the case 6 can be determined at the positioning positions 10F (see also FIG. 5). Note that since it becomes more difficult to arrange the projecting pieces α1, α2 in the narrow portions βn as a separating distance between the groove bottoms of the narrow portions βn and the tip parts of the projecting pieces α1, α2 decreases, the separating distance is preferably about 0.5 mm.

On the other hand, the wide portions βw are parts whose groove width is widened toward the lower side of the side wall portion 61 and serve as insertion openings for the projecting pieces α1, α2 (see, for example, FIGS. 2 and 3) in accommodating the assembly 10 into the case 6. By providing the engaging grooves β1, β2 with the wide portions βw, the assembly 10 is easily arranged in the case 6. This is specifically described in the method for manufacturing the reactor 1 to be described later.

Note that an overall groove depth of the engaging grooves β1, β2 needs not be constant. For example, the groove depth may be gradually reduced from the wide portion βw toward the narrow portion βn.

(Escaping Grooves)

Similarly to the engaging grooves β1, β2, the escaping groove δ1 (also the escaping groove δ2) also extends upward from the lower end of the side wall portion 61 (see FIG. 4(D)). The escaping groove δ1 can be formed by shaving the side wall portion 61.

The escaping grooves δ1, δ2 have a groove width capable of allowing the projecting pieces γ1, γ2 to escape in the coil axis direction. More specifically, the groove width of the escaping grooves δ1, δ2 is larger than the width of the projecting pieces γ1, γ2 by more than 2 mm, but there is no particular upper limit for the groove width of the escaping grooves δ1, δ2.

A groove depth of the above escaping grooves δ1, δ2 is not particularly limited. For example, the groove depth of the escaping grooves δ1, δ2 is so set that tip parts of the projecting pieces γ1, γ2 arranged in the escaping grooves δ1, δ2 are in contact with groove bottoms of the escaping grooves δ1, δ2 or so set that the tip parts of the projecting pieces γ1, γ2 are separated from the groove bottoms of the escaping grooves δ1, δ2 by less than about 1 mm when the assembly 10 is arranged in the case 6. By forming the escaping grooves δ1, δ2 having such a groove depth, the position of the frame-shaped bobbin 42 in the coil width direction in the case 6 can be determined at the escaping positions 10E (see also FIG. 5). Here, since it becomes more difficult to arrange the projecting pieces γ1, γ2 in the escaping grooves δ1, δ2 as a separating distance between the groove bottoms of the escaping grooves δ1, δ2 and the tip parts of the projecting pieces γ1, γ2 decreases, the separating distance is preferably about 0.5 mm. Besides, the groove depth of the escaping grooves δ1, δ2 may be so set that the projecting pieces γ1, γ2 are separated from the groove bottoms of the escaping grooves ε1, δ2 by more than 1 mm By doing so, the projecting pieces γ1, γ2 can be allowed to escape in the coil width direction at the escaping positions 10E.

Note that although the groove width of the escaping grooves δ1, δ2 in this embodiment is constant in an extending direction, it may change at an intermediate position in the extending direction. Even in such a case, clearances between the escaping grooves δ1, δ2 and the projecting pieces γ1, γ2 in the groove width direction are preferably at a minimum 2 mm. Further, an overall groove depth of the escaping grooves δ1, δ2 needs not be constant. For example, the groove depth may be gradually reduced from an entrance side.

[Lid]

As shown in FIG. 1, the lid 9 is a plate-like member for sealing an opening of the case 6. By mounting the lid 9 on the case 6, the assembly 10 in the case 6 can be protected from an external environment. Note that the lid 9 is not essential, but optional in the reactor of the first embodiment.

[Miscellaneous]

Sealing resin may be filled into the case 6. By using the sealing resin, the assembly 10 can be fixed in the case 6 and protected. Further, by using sealing resin having excellent thermal conductivity, heat generated in the assembly 10 when the reactor 1 is operated can be efficiently allowed to escape toward the case 6. This sealing resin is also optional and may be used together with the aforementioned lid 9 or may be singly used. That is, either a configuration with the lid and the sealing resin or a configuration without the lid and with the sealing resin may be adopted.

<<Effects>>

The reactor 1 configured as described above is excellent in productivity. This is because the assembly 10 is easily arranged in the case 6 due to the presence of the two positioning positions 10F for determining the position of the assembly 10 in the case as shown in FIG. 5. This effect of easily arranging the assembly 10 in the case 6 is an effect in the manufacturing process of the reactor 1. Accordingly, the method for manufacturing the reactor of the embodiment is described below and the effect of the reactor of the embodiment is described in the course of the description. In addition, each component of the reactor not described yet is also described in detail.

<<Method for Manufacturing the Reactor>>

The reactor 1 described above can be manufactured, for example, in accordance with the following steps:

step of fabricating the assembly 10,
step of accommodating the assembly 10 into the case 6, and
step of mounting the lid 9 on the case 6.

Each step is successively described and each component of the reactor 1 of this embodiment is described in detail below.

<<Step of Fabricating the Assembly 10>>

In fabricating the assembly 10, the coil 2, the magnetic core 3, the inner bobbins 51, 52 and the frame-shaped bobbins 41, 42 may be prepared as shown in FIG. 3. First, the prepared members are described.

[Prepared Members]

(Coil)

The coil 2 includes the pair of coil elements 2A, 2B and the coupling portion 2r coupling both coil elements 2A, 2B. The respective coil elements 2A, 2B are formed into a hollow tube with the same number of turns and in the same winding direction and juxtaposed in the lateral direction so that the axial directions thereof are parallel. Further, the coupling portion 2r is a part that may be bent into a U shape linking both coil elements 2A, 2B on the other end side (right side in the plane of FIG. 3) of the coil 2. Coil 2 may be formed by spirally winding one joint-less winding wire or may be formed by fabricating the coil elements 2A, 2B by different winding wires and joining end parts of the winding wires of the coil elements 2A, 2B by welding, crimping or the like.

An insulated wire including an insulation coating made of an insulating material on the outer periphery of a conductor such as a rectangular wire or a round wire made of an electrically conductive material such as copper, aluminum, magnesium or an alloy of one of these metals can be preferably used for the coil 2. In this embodiment, an insulated rectangular wire in which a conductor is a rectangular wire made of copper and an insulation coating is made of enamel (typically polyamide-imide) is used and each coil element 2A, 2B is an edge-wise coil formed by edge-wise winding this insulated rectangular wire. Further, although an end surface shape of each coil element 2A, 2B is a rectangular shape with rounded corners, it can be appropriately changed to a circular shape or the like.

The opposite end parts 2a, 2b of the coil 2 are drawn out from turn forming parts and connected to terminal members 8a, 8b (see FIG. 1). An external device (not shown) such as a power supply for supplying power to the coil 2 may be connected via these terminal members 8a, 8b.

(Magnetic Core)

The magnetic core 3 may be formed by combining the pair of inner core portions 31 arranged in the respective coil elements 2A, 2B and the pair of outer core portions 32 exposed from the coil 2 in an annular manner.

((Inner Core Portion))

The inner core portion 31 may be a laminated columnar body formed by alternately coupling substantially rectangular parallelepipedic core pieces 31m made of a magnetic material and gap members 31 g having a lower magnetic permeability than the core pieces 31m. In this example, the number of the gap members 31g is larger than that of the core pieces 31m by one and the gap members 31g are arranged on one end surface (left end surface in the plane of FIG. 3) and the other end surface (right end surface in the plane of FIG. 3) of the inner core portion 31. The core pieces 31m and the gap members 31g are preferably joined such as by a thermosetting adhesive because the adhesive can be expected to function as a cushioning material (for suppressing collision of the members and noise when the reactor 1 is used).

((Outer Core Portion))

The outer core portions 32 are, for example, columnar core pieces with a substantially dome-shaped upper surface. One outer core portion 32 arranged on the left side of FIG. 3 (for example) faces surfaces of the inner core portions 31 on one end side (left side in FIG. 3 for example) and the other outer core portion 32 arranged on the right side (in FIG. 3 for example) faces the other end sides (right side in FIG. 3 for example) of the inner core portions 31. As a result, the annular magnetic core 3 is formed by the inner core portions 31 and the outer core portions 32.

((Material of Core Pieces))

A powder compact using a soft magnetic powder represented by iron group metals such as iron, alloys thereof and the like, a molding hardened body made of resin containing a soft magnetic powder, a laminated body formed by laminating a plurality of magnetic thin plates (e.g., electromagnetic steel plates) including an insulation film or the like can be used as each core piece constituting the above inner and outer core portions 31, 32.

The core pieces 31m constituting the inner core portions 31 and the outer core portions 32 may have different magnetic characteristics. For example, the magnetic characteristics of both may be made different by using different materials for the core pieces 31m and the outer core portions 32 or by forming the core pieces 31m into molding hardened bodies and the outer core portions 32 into powder compacts. Since the amount of the magnetic powder contained in a molding hardened body generally tends to be less than that contained in a powder compact, a relationship "relative magnetic permeability of the molding hardened body<relative magnetic permeability of the powder compact" tends to hold. Thus, if the core pieces 31m of the inner core portions 31 are formed into the molding hardened bodies and the outer core portions 32 are formed into the powder compacts, a magnetic core 3 (of reactor 1) can be formed that is difficult to magnetically saturate even if a large current is used. Note that the inner core portion 31 may be formed by one core piece 31m made of a molding hardened body and two gap members 31g bonded to opposite end surfaces of the core piece 31m.

(Inner Bobbins)

The inner bobbins 51, 52 are members respectively mounted on the upper and lower surfaces of the inner core portion 31 and interposed between the outer peripheral surface of the inner core portion 31 and the inner peripheral surface of the coil element 2A, 2B to ensure insulation between the inner core portion 31 and the coil element 2A, 2B. The inner bobbin 51 (52) of this embodiment is composed of a flat surface portion corresponding to the upper surface (lower surface) of the inner core portion 31 and curved portions corresponding to corner parts of the inner core portion 31, and a through hole is formed in the flat surface portion. Note that the shape of the inner bobbins is not limited to the aforementioned one and may be, for example, a tubular shape capable of accommodating the inner core portion 31 inside.

The inner bobbins 51, 52 can be, for example, made of an insulating material such as polyphenylene sulfide (PPS) resin, polytetrafluoroethylene (PTFE) resin, polybutylene terephthalate (PBT) resin or liquid crystal polymer (LCP). Insulation property and heat radiation property of the inner bobbins 51, 52 may be improved by containing at least one kind of ceramic filler selected from silicon nitride, alumina, aluminum nitride, boron nitride, mullite and silicon carbide.

(Frame-Shaped Bobbins)

The frame-shaped bobbin 41 (42) includes a pair of through holes 4h, 4h, a partitioning portion 4d and an eaves portion 4e in addition to the projecting pieces $\alpha 1$, $\alpha 2$ (projecting pieces $\gamma 1$, $\gamma 2$) already described. The through holes 4h are parts into which end parts of the inner core portions 31 are inserted in fabricating the assembly 10. Further, the partitioning portion 4d is a part to be inserted into between the coil elements 2A, 2B to hold the both coil elements 2A, 2B in a separated state. Further, the eaves portion 4e is a part to be inserted into between the coupling portion 2r and the outer core portion 32 to ensure insulation between the both.

The frame-shaped bobbins 41, 42 can be made of an insulating material which can be used for the inner bobbins 51, 52. Of course, insulation property and heat radiation property of the frame-shaped bobbins 41, 42 may be improved by containing ceramic filler also in the frame-shaped bobbins 41, 42.

[Assembling Procedure]

In this embodiment, the coil 2 formed by winding the winding wire is prepared and the assembly 10 is completed by assembling the magnetic core 3 made up of a plurality of core pieces with the coil 2. Specifically, the inner bobbins 51, 52 are mounted on the outer peripheries of the inner core portions 31 and the resulting assemblies are inserted into the coil elements 2A, 2B. Subsequently, the inner core portions 31 are sandwiched by the outer core portions 32 in a state where the frame-shaped bobbins 41, 42 are disposed on the end surfaces of the inner core portions 31. At that time, the end parts of the inner core portions 31 are inserted into the through holes 4h of the frame-shaped bobbins 41, 42 and the end surfaces of the inner core portions 31 are joined to the outer core portions 32. Here, the inner core portions 31 and the outer core portions 32 are preferably joined, for example, by a thermosetting adhesive. This is because the adhesive can be expected to function as a cushioning material for suppressing collision of the members and noise when the reactor 1 is used can be suppressed.

<<Step of Accommodating the Assembly 10 into the Case 6>>

Figure 6:
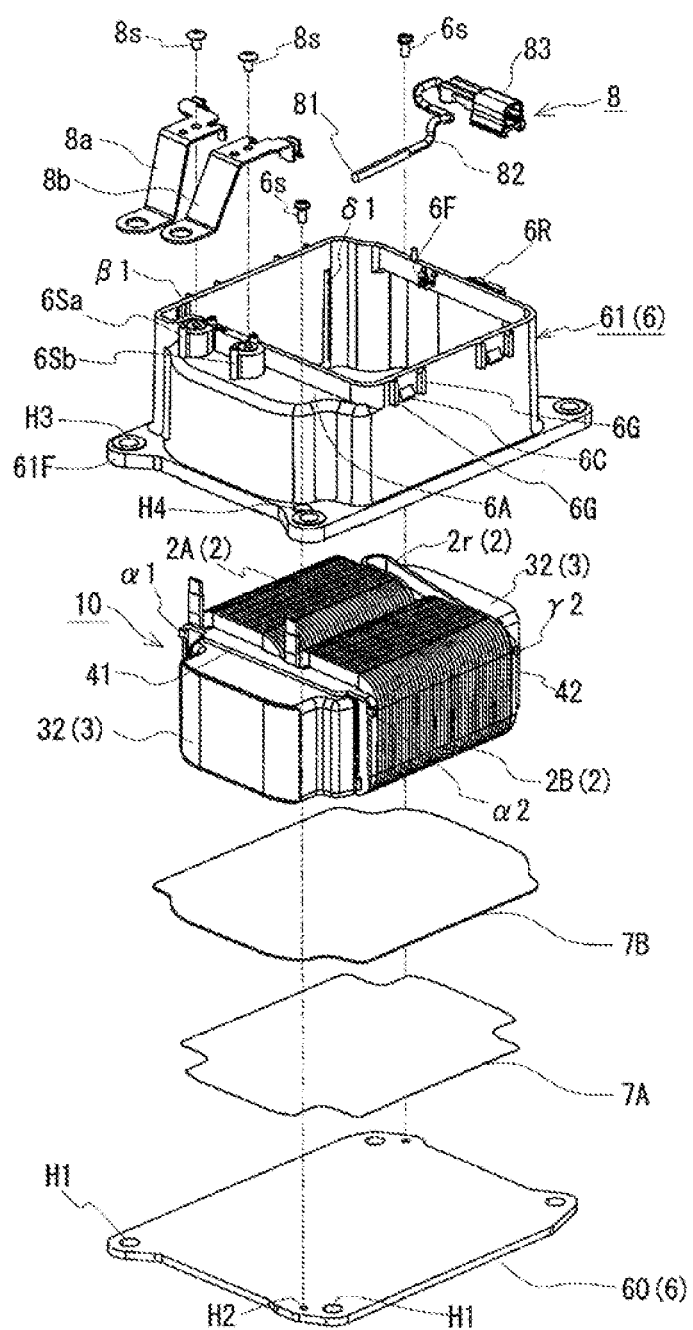
FIG. 6 shows an exploded perspective view of the reactor of the first embodiment.

In accommodating the assembly 10 into the case 6, the case 6, an insulation sheet 7A and an adhesive sheet 7B may be prepared as shown in FIG. 6. First, the prepared members are described and then the procedure of accommodating the assembly 10 into the case 6 is described.

[Prepared Members]

(Case)

The case 6 prepared in this embodiment is formed by assembling the bottom plate portion 60 in the form of a flat plate and the side wall portion 61 fabricated separately from this bottom plate portion 60. Both bottom plate portions 60, 61 can be made of different materials or made of the same material.

((Bottom Plate Portion))

The bottom plate portion 60 is a plate-like member which functions as a heat radiation path from the assembly 10 to a mounting object (e.g., cooling base) of the reactor 1 while supporting the assembly 10. Specifically, one surface (upper surface in the figure planes) of the bottom plate portion 60 is a placing surface on which the assembly 10 is to be placed, and the other surface (lower surface in the figure planes) of the bottom plate portion 60 is a mounting surface on the cooling base (not shown) for cooling the reactor 1.

A first mounting hole H1 for mounting the reactor 1 on the cooling base is provided at each of four corners of the bottom plate portion 60. Further, second mounting holes H2 are provided at two diagonal corner positions out of the four corners.

Since the bottom plate portion 60 configured as described above is arranged in proximity to the coil 2, it is preferably made of a nonmagnetic material. Further, since the bottom plate portion 60 is used as a heat radiation path for the assembly 10, it is preferably made of a metal material excellent in thermal conductivity. For example, the bottom plate portion 60 may be made of a nonmagnetic metal such as aluminum or its alloy or magnesium or its alloy. Since the nonmagnetic metals listed above are light in weight, they are suitable as materials for vehicle-mounted components for which a weight reduction is desired. A thickness of this bottom plate portion 60 is preferably about 2 to 5 mm in consideration of strength and magnetic flux shielding property.

((Side Wall Portion))

The side wall portion 61 is a tubular member having openings on upper and lower sides and includes the engaging groove β1 and the escaping groove δ1 on the inner wall surface thereof (the engaging groove β2 and the escaping groove δ2 are located at positions not shown in FIG. 6) as already described with reference to FIG. 4. The side wall portion 61 may include engaging claws 6C at positions of the outer wall surface thereof near the upper opening and guide projections 6G arranged at opposite sides of the engaging claws 6C in addition to the engaging grooves β1, β2 and the escaping grooves δ1, δ2. The engaging claw 6C is a projection having a triangular cross-section, a projecting amount of which from the outer peripheral surface of the case 6 gradually increases from the upper side toward the lower side of the case 6, and catches an annular fastener 9C (FIG. 1) provided on the lid 9 to be described later. This engaging claw 6C is a member constituting a part of a so-called snap-fit structure. On the other hand, the guide projections 6G, 6G may be a pair of elongated projections extending in a height direction of the case 6 and configured to sandwich the fastener 9C from opposite sides when the annular fastener 9C to be described later is engaged with the engaging claw 6C, and function to guide the fastener 9C to the engaging claw 6C. Note that the snap-fit structure can also be formed on the inner wall surface of the side wall portion 61.

A flange portion 61F is provided on a lower edge part of the above side wall portion 61. A contour shape of the flange portion 61F substantially coincides with that of the aforementioned bottom plate portion 60 and the flange portion 61F is formed with third mounting holes H3 and fourth mounting holes H4 at positions corresponding to the first and second mounting holes H1, H2 of the bottom plate portion.

Further, the side wall portion 61 is provided with core cover portions 6A, 6B for surrounding the peripheral surfaces and upper surfaces of the outer core portions 32, 32 of the assembly 10 when the assembly 10 is accommodated into the case 6 (see also FIG. 4). That is, the core cover portions 6A, 6B are shaped to correspond to the outer peripheral surface shape of the outer core portions 32, 32. These core cover portions 6A, 6B can effectively prevent the assembly 10 accommodated in the case 6 from coming out of the case 6. This is because the upper opening of the side wall portion 61 is made smaller than the assembly 10 by providing the core cover portions 6A, 6B. Clearances between the inner peripheral surfaces of the core cover portions 6A, 6B and the outer peripheral surfaces of the outer core portions 32, 32 are preferably about 0.5 to 3.0 mm.

Two cylindrical terminal blocks 6Sa, 6Sb may be provided on the core cover portion 6A on a front side in the figure planes (side in FIG. 6 where the end parts 2a, 2b of the coil 2 of the assembly 10 are arranged) out of the above core cover portions 6A, 6B. Each terminal block 6Sa, 6Sb may be formed with a screw hole so that the terminal member 8a, 8b can be fixed to the terminal block 6Sa, 6Sb by a screw. On the other hand, a slide rail 6R which serves as a mounting portion for a temperature measuring member 8 (see also FIG. 1) to be described later may be provided on the core cover portion 6B (see FIG. 4(B)) on a back side in the figure planes (side where the coupling portion 2r of the coil 2 is arranged).

The side wall portion 61 configured as described above is preferably made of resin. This is because the side wall portion 61 can be easily formed into a complicated shape such as by injection molding, by using resin. For example, PBT resin, urethane resin, PPS resin, acrylonitrile butadiene styrene (ABS) resin or the like can be used as the resin as the material for the side wall portion 61. Since these reins are excellent in electrical insulation, insulation between the coil 2 of the assembly 10 and the side wall portion 61 can be easily ensured. At least one kind of ceramic filler selected from silicon nitride, alumina, aluminum nitride, boron nitride, mullite and silicon carbide may be contained in these resins. By doing so, insulation property and heat radiation property of the side wall portion 61 can be improved.

Note that the side wall portion 61 can also be made of metal. For example, if the side wall portion 61 is made of nonmagnetic metal such as aluminum, it can be provided with an electromagnetic wave shield function.

(Insulation Sheet and Adhesive Sheet)

As shown in FIG. 6, the insulation sheet 7A and the adhesive sheet 7B are sheet-like members for bonding the assembly 10 to the bottom plate portion 60 of the case 6. The insulation sheet 7A is a member for ensuring insulation between the bottom plate portion 60 made of nonmagnetic metal and the assembly 10 and bonded to the bottom plate portion 60 by an adhesive or the like. On the other hand, the adhesive sheet 7B is a member, both surfaces of which are adhesive and soft and which firmly holds the assembly 10 having a complicated uneven shape in close contact with the insulation sheet 7A.

The insulation sheet 7A is required to have a predetermined voltage resistance characteristic (10 kV/50 μm or higher in the reactor 1). Further, the insulation sheet 7A preferably has an excellent thermal conductivity of 0.1 W/m·K or higher so that heat generated in the coil 2 (coil elements 2A, 2B) can be effectively transmitted to the bottom plate portion 60. The higher the thermal conductivity (particularly preferably, 2.0 W/m·K or higher), the better.

On the other hand, the adhesive sheet 7B is required to have such an insulation property capable of sufficiently insulating between the coil 2 and the bottom plate portion 60 and such heat resistance as not to be softened at a highest reachable temperature when the reactor 1 is used. For example, insulating resins such as thermosetting resins including epoxy resin, silicone resin and unsaturated polyester and thermoplastic insulating resins including PPS resin and liquid crystal polymer (LCP) can be preferably used for the adhesive sheet 7B. Ceramic filler illustrated in the description of the side wall portion 61 may be contained in the insulating resin. By doing so, insulation property and heat radiation property of the adhesive sheet 7B can be improved. Thermal conductivity of the adhesive sheet 7B is preferably about equal to that of the insulation sheet 7A.

(Miscellaneous)

The reactor 1 of this embodiment includes the temperature measuring member 8 for monitoring the temperature of the assembly 10 during the operation of the reactor 1. The temperature measuring member 8 includes a known temperature sensor 81 such as a thermocouple, a wiring 82 connected to the temperature sensor 81 and a tubular holding portion 83 for holding an end part of the wiring 82. The wiring 82 is inserted into an opening of the tubular holding portion 83 on one side and held in the holding portion 83. Thus, if a wiring of a measuring device outside the reactor 1 is inserted into an opening of the holding portion 83 on the other side, the temperature sensor 81 and the measuring device are electrically connected. Further, a slide groove may be formed on the outer peripheral surface of the holding portion 83, and the holding portion 83 can be mounted on the slide rail R provided on the side wall portion 61 of the case 6 described above.

[Procedure of Accommodating the Assembly 10]

First, the insulation sheet 7A is mounted on the upper surface of the bottom plate portion 60 using the adhesive and the adhesive sheet 7B is mounted on that insulation sheet 7A. Then, the assembly 10 is placed on that adhesive sheet 7B. Since the placed position of the assembly 10 can be corrected later, the assembly 10 may be roughly placed. As described above, if the assembly 10 is placed on the adhesive sheet 7B, the flexible adhesive sheet 7B fits to the uneven lower surface of the assembly 10 and the upper surface of the adhesive sheet 7B and the lower surface of the assembly 10 are held in close contact. Note that, instead of using the adhesive sheet 7B, an adhesive may be applied or printed on the upper surface of the insulation sheet 7A.

Subsequently, the side wall portion 61 is mounted from above the assembly 10 before the adhesive sheet 7B is cured. Since the groove width (e.g. 5 mm or more) at the entrance sides of the wide portions βw (see FIG. 4) of the engaging grooves β1, β2 is fairly larger than the width of the projecting pieces α1, α2, the engaging grooves β1, β2 are easily positioned with respect to the projecting pieces α1, α2 of the assembly 10 placed on the bottom plate portion 60 and the projecting pieces α1, α2 are easily fitted into the engaging grooves β1, β2. On the other hand, since the groove width (e.g. 5 mm or more) of the escaping grooves δ1, δ2 is fairly larger than the width of the projecting pieces γ1, γ2, the projecting pieces γ1, γ2 are naturally allowed to escape in the coil axis direction in the escaping grooves δ1, δ2 if the projecting pieces α1, α2 are fitted into the engaging grooves β1, β2. That is, it is substantially sufficient to position the engaging grooves β1, β2 with respect to the projecting pieces α1, α2 in covering the assembly 10 with the side wall portion 61 and the assembly 10 can be very easily covered with the side wall portion 61.

As the side wall portion 61 covering the assembly 10 is gradually and vertically lowered (i.e. as the side wall portion 61 is moved toward the bottom plate portion 60), the projecting pieces α1, α2 are guided to the narrow portions βn (see FIG. 4) of the engaging grooves β1, β2 and the position of the assembly 10 in the side wall portion 61 is determined. On the other hand, since the groove width of the escaping grooves δ1, δ2 is larger than the width of the projecting pieces γ1, γ2 and the outer side surfaces of the projecting pieces γ1, γ2 are not in contact with the inner wall surfaces of the escaping grooves δ1, δ2, no resistance is generated when the side wall portion 61 is vertically lowered.

After the side wall portion 61 is completely lowered, the side wall portion 61 and the bottom plate portion 60 are integrated using screws 6s (fixing members). The fourth mounting holes H4 of the side wall portion 61 and the second mounting holes H2 of the bottom plate portion 60 are used for screwing. By performing screwing, the side wall portion 61 is fixed at a proper position with respect to the bottom plate portion 60 even if the side wall portion 61 is slightly displaced from the bottom plate portion 60 in covering the assembly 10 with the side wall portion 61. Simultaneously, the position of the assembly 10 in the case 6 is also determined.

[Arrangement of the Prepared Components]

The terminal members 8a, 8b are mounted on the end parts 2a, 2b of the coil 2 of the assembly 10 and the temperature measuring member 8 is arranged. The terminal member 8a, 8b is substantially in the form of a slide, one end thereof is crimped or welded to the end part 2a, 2b of the coil 2 and an intermediate part thereof is fixed to the terminal block 6Sa, 6Sb by a screw 8a. By doing so, the other end (connection end to an electrical device for supplying power to the reactor 1) of the terminal member 8a, 8b is arranged at a position lower than the upper end of the case 6 (i.e. upper end of the side wall portion 61). Here, since the position of the assembly 10 with respect to the side wall portion 61 of the case 6 is precisely determined by the engagement of the projecting pieces α1, α2 and the engaging grooves β1, β2, screw holes formed in the intermediate parts of the terminal members 8a, 8b are accurately positioned at the positions of the terminal blocks 6Sa, 6Sb. Thus, in the configuration of this embodiment, the terminal members 8a, 8b can be easily mounted.

On the other hand, the temperature sensor 81 is arranged between the coil elements 2A, 2B of the assembly 10 in arranging the temperature measuring member 8 (see also FIG. 1). Further, the wiring 82 is laid along a groove between the coil elements 2A, 2B and caught by a hook 6F of the side wall portion 61, and the holding portion 83 is fitted onto the slide rail 6R.

After the mounting of the terminal members 8a, 8b and the temperature measuring member 8 is completed, sealing resin such as epoxy is filled into the case 6 to fix the assembly 10 in the case 6. The sealing resin may contain ceramic filler. By doing so, heat radiation property of the reactor 1 can be enhanced. Note that the assembly 10 may be fixed in the case 6 using an overpass-like stay instead of the sealing resin. In such a case, heat radiation property of the reactor 1 can be improved if a configuration for circulating a refrigerant in the case 6 is adopted.

<<Step of Mounting the Lid 9 on the Case 6>>

As described above, the lid 9 is optional and can be dispensed with. However, by providing the lid 9, the assembly 10 in the case 6 can be more reliably protected from an external environment. The configuration of the prepared lid 9 is described below and, then, the procedure of mounting the lid 9 is described.

[Prepared Member]
(Lid)

As shown in FIG. 1, the lid 9 is a member for closing the opening of the case 6 accommodating the assembly 10 by covering the opening. The lid 9 of this embodiment is sized to cover the entire upper opening of the side wall portion 61. Further, this lid 9 includes a terminal cover portion 90 which bulges out from the upper opening of the side wall portion 61 and covers the terminal members 8a, 8b connected to the assembly 10 when the lid 9 is mounted on the case 6. Further, the lid 9 includes four annular fasteners 9C on the peripheral edge thereof. The fasteners 9C are engaged with the engaging claws 6C provided on the outer wall surface of the side wall portion 61 of the case 6 described above and constitute the so-called snap-fit structure.

[Mounting of the Lid]

The lid 9 described above is mounted on the upper opening of the case 6. At that time, the fasteners 9C of the lid 9 are engaged with the engaging claws 6C of the case 6 and the lid 9 is fixed to the case 6. At this time, since the guide projections 6G, 6G are formed at the opposite sides of the engaging claws 6C, the fasteners 9C are smoothly guided to the engaging claws 6C. Further, if the lid 9 is mounted on the case 6, parts (parts to be fixed to the terminal blocks 6Sa, 6Sb) of the terminal members 8a, 8b are covered by the terminal cover portion 90 of the lid 9 and those covered parts are protected from mechanical impacts.

<<Effects Seen in the Manufacturing Process>>

As described above, by setting the two positioning positions and the two escaping positions in the reactor 1, the step of arranging the assembly 10 in the case 6 in the manufacturing process of the reactor 1 can be very easily performed. As a result, the reactor 1 can be manufactured with good productivity. Note that the completed reactor 1 may be mounted on the cooling base as a mounting object. In mounting the reactor 1, it is sufficient to drive screws into the third mounting holes H3 of the case 6.

<Second Embodiment>

Figure 7:
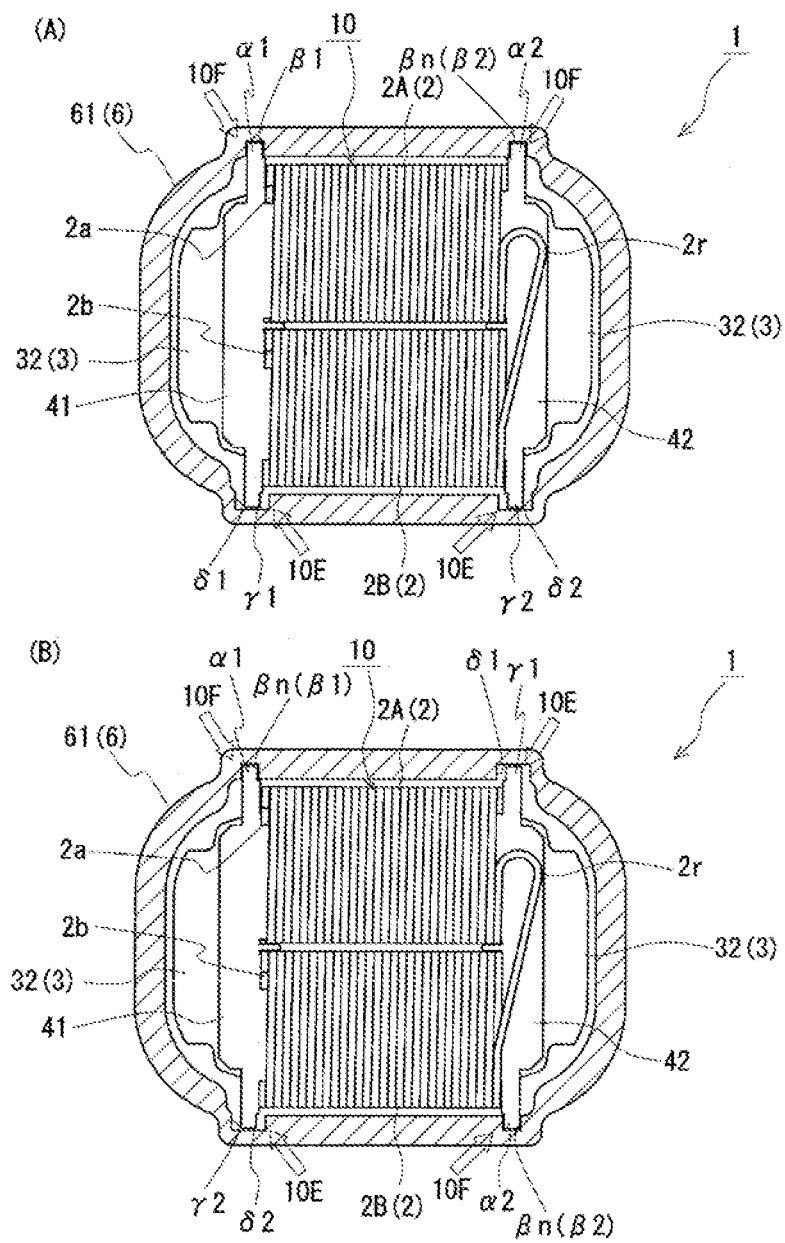
FIGS. 7(A) and 7(B) are diagrams showing an engaged state of a case and frame-shaped bobbins of an assembly in a second embodiment.

In a second embodiment, modes in which positioning positions 10F and escaping positions 10E are located at positions different from those of the first embodiment are described based on FIGS. 7. Note that although both configurations shown in FIGS. 7(A) and 7(B) use identically shaped frame-shaped bobbins 41, 42, the frame-shaped bobbins 41, 42 may be differently shaped.

First, in the mode shown in FIG. 7(A), a projecting piece α1 (α2) of the frame-shaped bobbin 41 (42) is engaged with an engaging groove β1 (β2) of the case 6. Further, in this mode, a projecting piece γ1 (γ2) of the frame-shaped bobbin 41 (42) is allowed to escape in an escaping groove δ1 (δ2) of the case 6 on the side of a coil element 2B in the coil width direction. That is, two positioning positions 10F are set on the same side in the coil width direction in the mode shown in FIG. 7(A).

On the other hand, in the mode shown in FIG. 7(B), the projecting piece α1 of the frame-shaped bobbin 41 and the engaging groove β1 of the case 6 are engaged on the side of the terminals 2a, 2b in the coil axis direction and on the side of the coil element 2A in the coil width direction, and the projecting piece γ2 of the frame-shaped bobbin 41 is allowed to escape in the escaping groove δ2 of the case 6 on the side of the terminals 2a, 2b in the coil axis direction and on the side of the coil element 2B in the coil width direction. Further, in this mode, the projecting piece α2 of the frame-shaped bobbin 42 and the engaging groove β2 of the case 6 are engaged on the side of a coupling portion 2r in the coil axis direction and on the side of the coil element 2B in the coil width direction and the projecting piece γ1 of the frame-shaped bobbin 42 is allowed to escape in the escaping groove δ1 of the case 6 on the side of the coupling portion 2r in the coil axis direction and on the side of the coil element 2A in the coil width direction. That is, two positioning positions 10F and two escaping positions 10E are both set at positions separated in both the coil width direction and the coil axis direction in the mode shown in FIG. 7(B).

In both modes shown in FIGS. 7(A) and 7(B), positioning has only to be performed at two positions in covering the assembly 10 with the side wall portion 61 of the case 6 and the assembly 10 is easily covered with the side wall portion 61.

<Third Embodiment>

Figure 8:
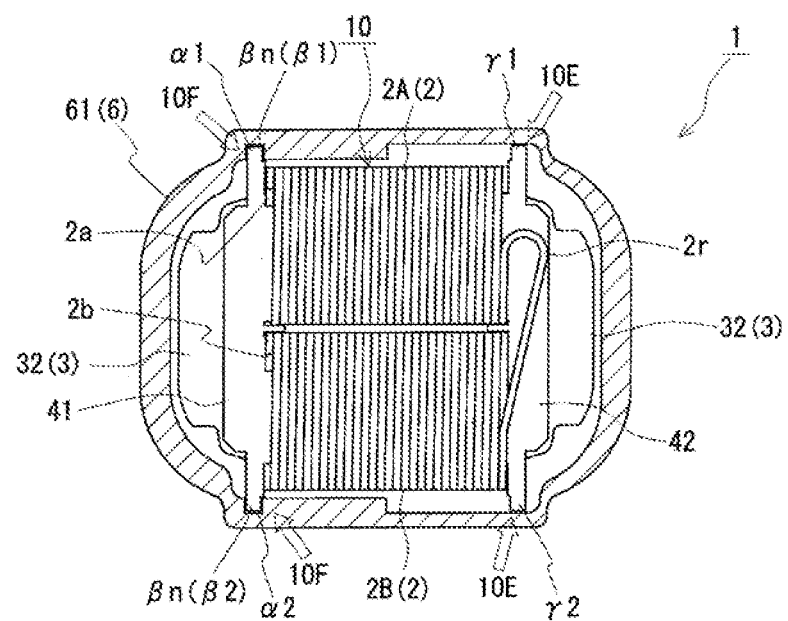
FIG. 8 is a diagram showing an engaged state of a case and frame-shaped bobbins of an assembly in a third embodiment.

In a third embodiment, an example in which the form of escaping positions 10E is different from that in the first and the second embodiments is described based on FIG. 8. Here, an engaged state of a frame-shaped bobbin 41 and a case 6 at positioning positions 10F is the same as in the first embodiment.

In a mode shown in FIG. 8, a frame-shaped bobbin 42 is formed with projecting pieces γ1, γ2, but a side wall portion 61 of the case 6 is not formed with grooves for receiving the projecting pieces γ1, γ2. Thus, in the mode shown in FIG. 8, parts of the inner peripheral surface of the side wall portion 61 near opposite side ends of the frame-shaped bobbin 42 entirely function as escaping portions, thereby forming the escaping positions 10E where the frame-shaped bobbin 42 is allowed to escape in the coil axis direction.

Also in the mode shown in FIG. 8, positioning has only to be performed at two positioning positions 10F in covering an assembly 10 with the side wall portion 61 of the case 6 and the assembly 10 is easily covered with the side wall portion 61.

Note that the position of the frame-shaped bobbin 42 in the coil element in the case 6 is determined at the escaping positions 10E in the mode of FIG. 8. Contrary to this, the frame-shaped bobbin 42 and the case 6 may not be engaged at all in the coil width direction at the escaping positions 10E. Even in such a case, there is no problem since the position of the entire assembly 10 in the case 6 is determined by the two positioning positions 10F.

<Fourth Embodiment>

Figure 9:
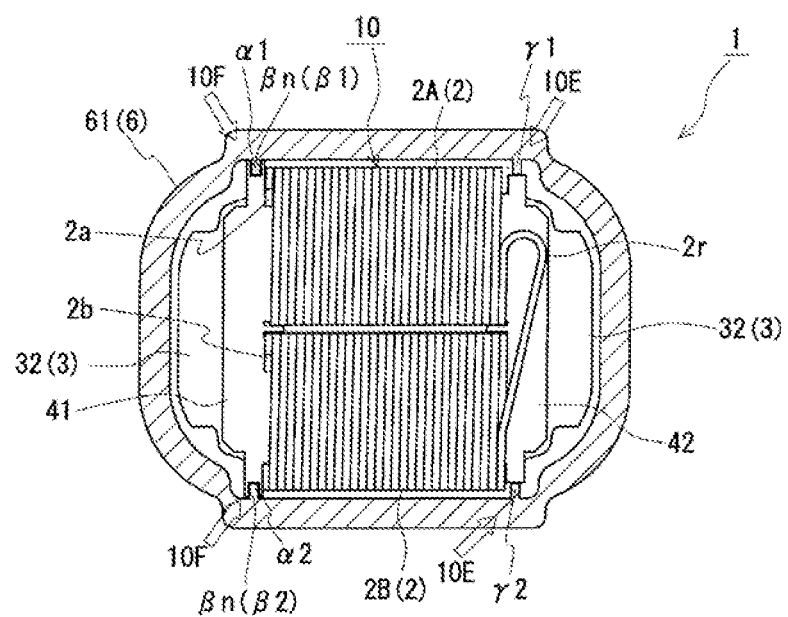
FIG. 9 is a diagram showing an engaged state of a case and frame-shaped bobbins of an assembly in a fourth embodiment.

In a fourth embodiment, a mode in which a frame-shaped bobbin 41 is formed with engaging grooves β1, β2 and a side wall portion 61 of a case 6 is formed with projecting pieces α1, α2, γ1 and γ2 is described based on FIG. 9.

First, in the mode shown in FIG. 9, the engaging grooves β1, β2 are formed on opposite side ends (upper and lower sides in the figure plane) of the frame-shaped bobbin 41, but grooves equivalent to the escaping grooves δ1, δ2 of the first to third embodiments are not formed on opposite side ends of a frame-shaped bobbin 42. On the other hand, the side wall portion 61 of the case 6 is formed with four projecting pieces α1, α2, γ1 and γ2 and, out of these, the projecting pieces α1, α2 are engaged with the engaging grooves β1, β2 of the frame-shaped bobbin 41 and the projecting pieces γ1, γ2 are allowed to escape in the coil axis direction. That is, in this mode shown in FIG. 9, the vicinities of the opposite side ends of the frame-shaped bobbin 42 function as escaping portions, two positioning positions 10F are formed on the side of end parts 2a, 2b in the coil axis direction and two escaping positions 10E are formed on the side of a coupling portion 2r in the coil axis direction.

Also in the mode shown in FIG. 9, positioning has only to be performed at two positions in covering an assembly 10 with the side wall portion 61 of the case 6 and the assembly 10 is easily covered with the side wall portion 61.

Note that the positioning positions 10F and the escaping positions 10E can be arranged as in the second embodiment even in the configuration of the fourth embodiment in which the grooves are provided on the frame-shaped bobbin and the projecting pieces are provided on the case.

<Fifth Embodiment>

Figure 10:
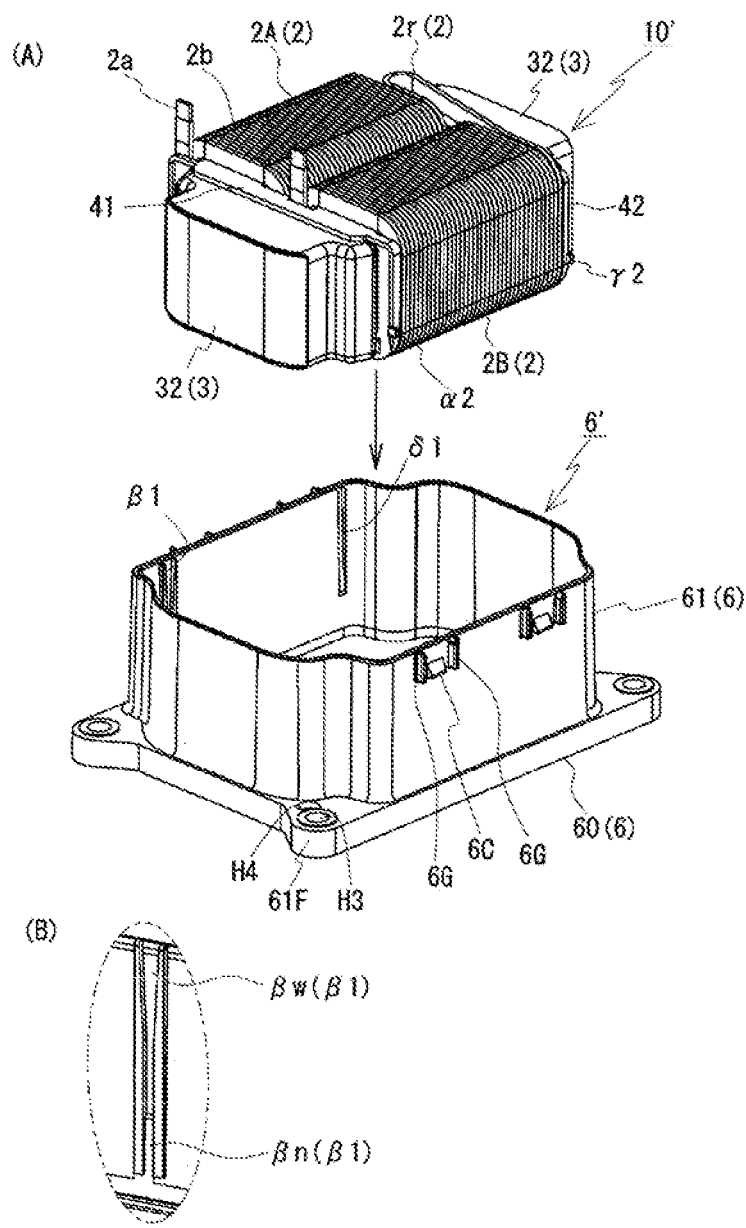
FIG. 10(A) shows a partial exploded perspective view of a reactor of a fifth embodiment.
FIG. 10(B) shows a partial enlarged view of a case-side engaging portion.

In a fifth embodiment, a mode using a case 6' in which a bottom plate portion 60 and a side wall portion 61 are integrated is described based on FIGS. 10(A) and (B).

In the case of using the integrated case 6', an assembly 10' is inserted from above the case 6' as shown in FIG. 10(A). Thus, the formation positions of bobbin-side engaging portions (projecting piece $\alpha2$ of a frame-shaped bobbin 41 and a projecting piece $\gamma2$ of a frame-shaped bobbin 42 in this example) and the shapes of case-side engaging portions (engaging groove $\beta1$ and escaping groove $\delta1$ of the case 6') in this example for receiving the bobbin-side engaging portions need to be elaborated.

First, the case 6' is described. As shown in FIG. 10(B), a wide portion $\beta w$ of the engaging groove $\beta1$ provided on the case 6' is arranged on an upper side of the side wall portion 61 and a narrow portion $\beta n$ thereof is arranged on a lower side and the wide portion $\beta w$ is linked to an upper end opening of the side wall portion 61. This is because the upper side of the side wall portion 61 serves as an insertion opening for receiving the projecting pieces since the assembly 10' is inserted from above the case 6'. Note that a projecting piece corresponding to the engaging groove $\beta1$ is located at a position not shown in FIG. 10(A) and an engaging groove corresponding to the projecting piece $\alpha2$ shown in FIG. 10(A) is located at a position not shown in FIG. 10(A).

On the other hand, the escaping groove $\delta1$ provided on the case 6' is linked to the upper end opening of the side wall portion 61. This is also because the upper side of the side wall portion 61 serves as the insertion opening for receiving the projecting pieces since the assembly 10' is inserted from above the case 6'. Note that a projecting piece corresponding to the escaping groove $\delta1$ is located at a position not shown in FIG. 10(A) and an engaging groove corresponding to the projecting piece $\gamma2$ shown in FIG. 10(A) is located at a position not shown in FIG. 10(A).

Next, the assembly 10' is described. As shown in FIG. 10(A), the formation positions of the projecting piece $\alpha2$ provided on the frame-shaped bobbin 41 and the projecting piece $\gamma2$ provided on the frame-shaped bobbin 42 are biased toward the lower side of the assembly 10'. This is because the narrow portion $\beta n$ of the engaging groove $\beta1$ provided on the case 6' is arranged on the lower side of the side wall portion 61 as shown in FIG. 10(B).

Effects similar to those of the first to fourth embodiments can be obtained also by the configuration of the fifth embodiment described above.

<Sixth Embodiment>

Figure 11:
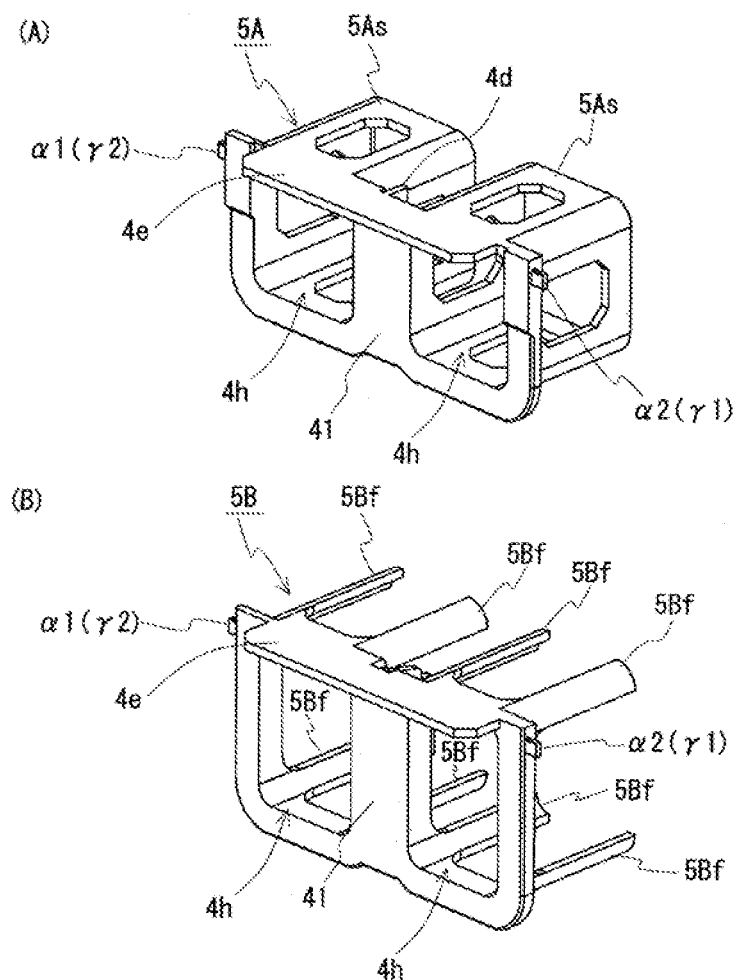
FIGS. 11(A) and 11(B) show perspective views of bobbin members provided in a reactor of a sixth embodiment.

In a sixth embodiment, a mode in which a frame-shaped bobbin is formed into a bobbin member by being integrated with inner bobbins is described based on FIGS. 11(A) and (B). Here, only bobbin members are described since components other than the bobbin members can be the same as those of the other embodiments.

A bobbin member 5A of FIG. 11(A) includes tubular portions 5As at positions corresponding to two through holes 4h, 4h of a frame-shaped bobbin 41 (a total of two tubular portions 5As are provided in the entire bobbin member 5A). A pair of bobbin members 5A are used, and the tubular portions 5As are inserted into coil elements 2A, 2B (see FIG. 3). Specifically, the tubular portions 5As of the bobbin member 5A function as inner bobbins.

A bobbin member 5B of FIG. 11(B) is provided with four bar-like frame pieces 5Bf arranged to surround each through hole 4h of the frame-shaped bobbin 41 (a total of eight frame pieces 5Bf are provided in the entire bobbin member 5B). The frame piece 5Bf has a curved shape corresponding to a corner part of a side surface of an inner core portion 31 (see FIG. 3). A pair of bobbin members 5B may be used, and the frame pieces 5Bf are inserted into the coil elements 2A, 2B (see FIG. 3). Specifically, the frame pieces 5Bf of the bobbin member 5B may function as inner bobbins.

<Seventh Embodiment>

The reactors of the first to sixth embodiments can be preferably used in an application in which energizing conditions are, for example, such that a maximum current (direct current) is about 100 A to 1000 A, an average voltage is about 100 V to 1000 V and a use frequency is about 5 kHz to 100 kHz, typically in a constituent part of a power conversion device to be mounted in a vehicle such as an electric vehicle or a hybrid vehicle. In this application, the reactor satisfying a condition that an inductance when the direct current is 0 A is 10 µH or higher and 2 mH or lower and an inductance when the maximum current flows is 10% or more of the inductance at 0 A is expected to be preferably used. An example in which the reactor of the embodiment is applied to a vehicle-mounted power conversion device is briefly described below based on FIGS. 12 and 13.

Figure 12:
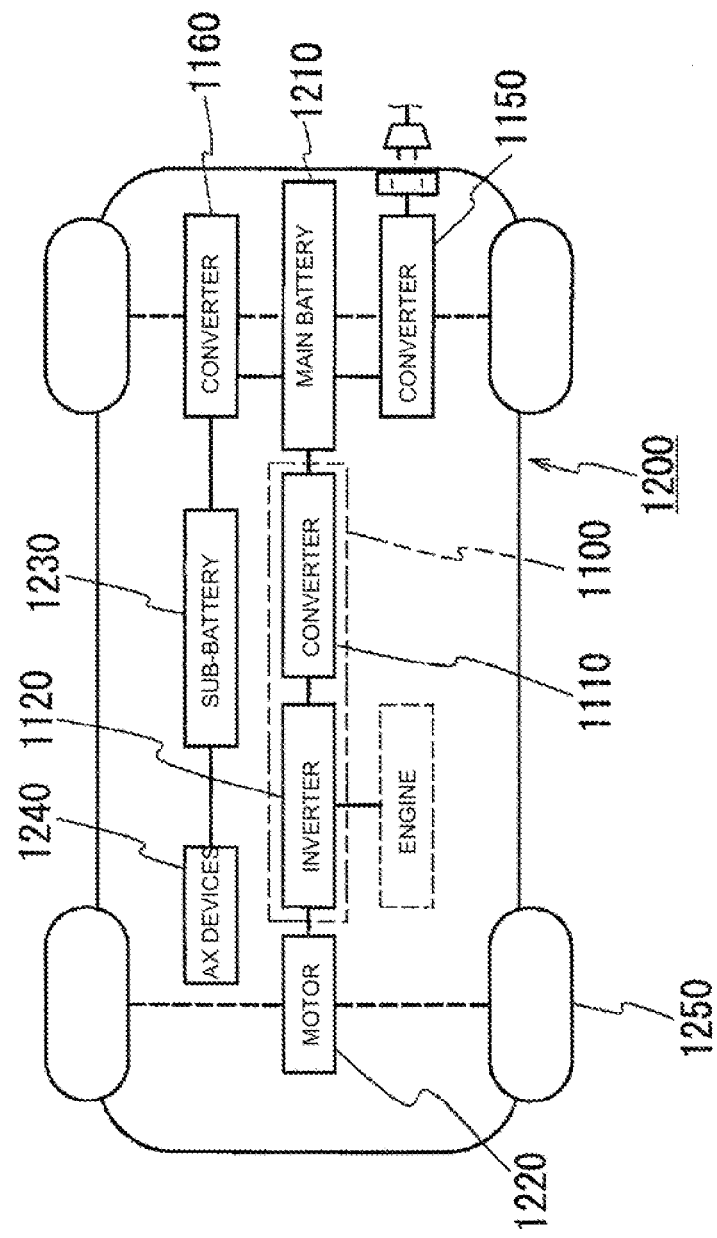
FIG. 12 is a schematic configuration diagram schematically showing a power supply system of a hybrid vehicle.

For example, a vehicle 1200 such as a hybrid vehicle or an electric vehicle includes a main battery 1210, a power conversion device 1100 connected to the main battery 1210 and a motor (load) 1220 to be driven by power supplied from the main battery 1210 and used for traveling as shown in FIG. 12. The motor 1220 is typically a three-phase alternating current motor, drives wheels 1250 during travel and functions as a generator during regeneration. In the case of a hybrid vehicle, the vehicle 1200 includes an engine in addition to the motor 1220. Although an inlet is shown as a charging position for the vehicle 1200 in FIG. 12, the vehicle may include a plug.

The power conversion device 1100 may include a converter 1110 connected to the main battery 1210 and an inverter 1120 connected to the converter 1110 to convert a direct current and an alternating current into each other. The converter 1110 shown in this example increases a direct-current voltage (input voltage) of about 200 V to 300 V of the main battery 1210 up to about 400 V to 700 V and feeds power to the inverter 1120 during the travel of the vehicle 1200. Further, the converter 1110 reduces a direct-current voltage (input voltage) output from the motor 1220 via the inverter 1120 to a direct-current voltage matching the main battery 1210 to charge the main battery 1210 during regeneration. The inverter 1120 feeds power to the motor 1220 while converting a direct current boosted by the inverter 1110 into a predetermined alternating current during the travel of the vehicle 1200 and converts an alternating-current output from the motor 1220 and outputs it to the converter 1110 during regeneration.

Figure 13:
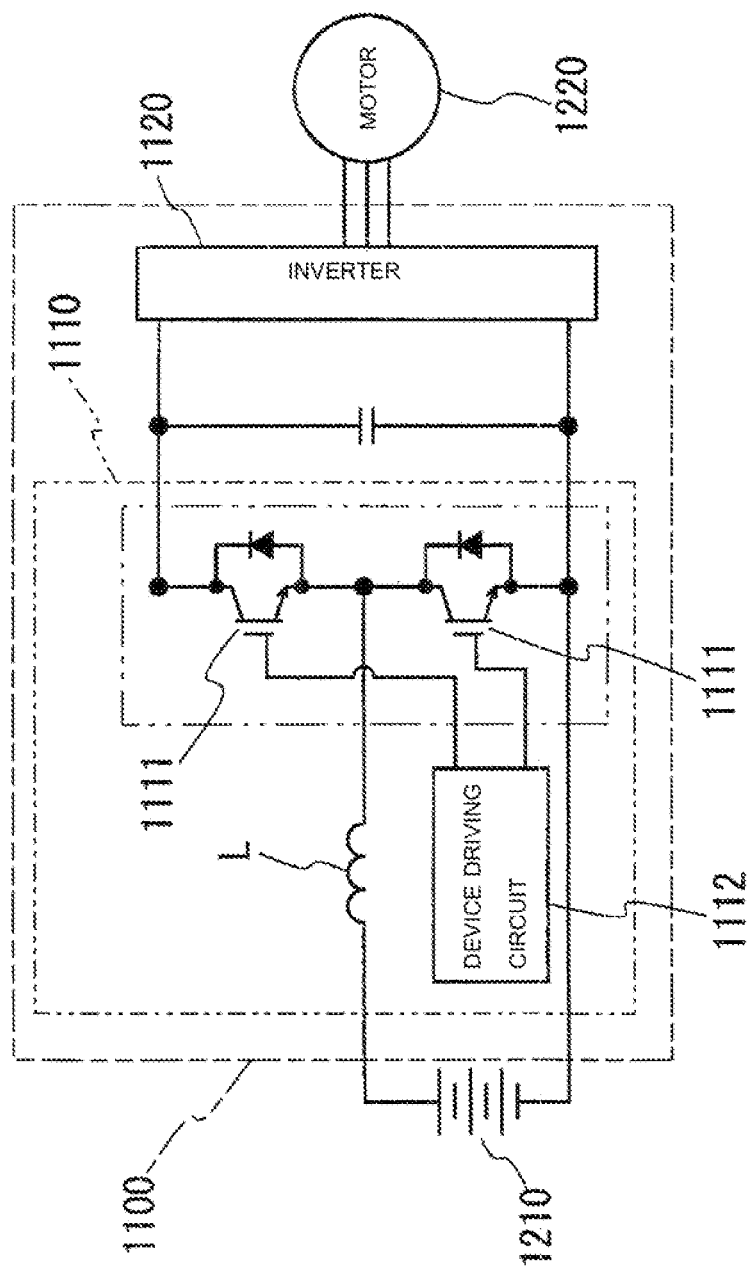
FIG. 13 is a schematic circuit diagram showing an example of a power conversion device with a converter.

The converter 1110 includes a plurality of switching elements 1111, a driving circuit 1112 for controlling the operation of the switching elements 1111 and a reactor L as shown in FIG. 13 and converts an input voltage (increases and decreases a voltage here) by being repeatedly turned on and off (switching operation). Power devices such as field-effect transistors (FETs), insulated gate bipolar transistors (IGBTs) are used as the switching elements 1111. The reactor L has a function of making changes smooth when a current is going to increase and decrease due to the switching operation, utilizing a property of a coil to hinder a change of a current flowing in a circuit. The reactor according to any one of the above first to sixth embodiments is used as this reactor L. A weight reduction of the power conversion device 1100 (including the converter 1110) can be realized by using the reactor that is light in weight and easy to handle.

Here, besides the converter 1110, the above vehicle 1200 includes a converter for power feeder 1150 connected to the main battery 1210 and a converter for auxiliary machine power supply 1160 connected to a sub-battery 1230 as a power supply for auxiliary machines 1240 and the main battery 1210 and configured to convert a high voltage of the main battery into a low voltage. The converter 1110 typically performs DC-DC conversion, but the converter for power feeder 1150 and the converter for auxiliary machine power supply 1160 perform AC-DC conversion. The converter for power feeder 1150 may also perform DC-DC conversion in some cases. Reactors configured similarly to the reactors of the above first to sixth embodiments and appropriately changed in size, shape and the like can be used as reactors of the converter for power feeder 1150 and the converter for auxiliary machine power supply 1160. Further, the reactor according to any one of the above first to six embodiments or the like can be used in a converter for converting input power and performing only voltage boosting or only voltage reduction.

Note that the present disclosure is not limited to the aforementioned embodiments and can be appropriately changed without departing from the gist thereof. For example, the configuration of the present disclosure can be also applied to a reactor including only one coil element.

The reactor of the present disclosure can be used in a constituent part of a power conversion device such as a bidirectional DC-DC converter mounted in a vehicle such as a hybrid vehicle, an electric vehicle or a fuel cell vehicle.

In the foregoing discussion, the present invention been described with reference to specific exemplary aspects thereof. But the present invention is not confined to the configuration listed in the foregoing embodiments, as it is easily understood that the person skilled in the art can modify such configurations into various other modes without departing from the broader spirit and scope of the invention. Accordingly, the foregoing discussion and the accompanying drawings are to be regarded as merely illustrative of the present invention rather than as limiting its scope in any manner.

The invention claimed is:
1. A reactor, comprising:
a coil including a coil element formed by winding a winding wire;
a magnetic core including a part to be inserted into the coil element;
a pair of frame-shaped bobbins respectively provided on opposite axial ends of the coil element; and
a case for accommodating an assembly of the coil, the magnetic core and the pair of frame-shaped bobbins, wherein:
two positions out of a total of four positions near opposite widthwise end parts of one frame-shaped bobbin and near opposite widthwise end parts of the other frame-shaped bobbin when the assembly accommodated in the case is viewed from above serve as positioning positions for determining the position of the assembly in the case and the remaining two positions serve as escaping positions;
projecting pieces are respectively provided at the four positions on either the frame-shaped bobbins or the case; and
engaging grooves to be engaged with the projecting pieces are respectively provided at the positioning positions and the escaping portions for allowing the projecting pieces to escape are respectively provided at the escaping positions on the other of the frame-shaped bobbins and the case.

2. A reactor according to claim 1, wherein the projecting pieces are provided on the frame-shaped bobbins.

3. A reactor according to claim 1, wherein the two positioning positions are both provided on one side in an axial direction of the coil element.

4. A reactor according to claim 3, wherein the two positioning positions are both provided on a side, where an end part of the winding wire constituting the coil element is arranged, in the axial direction of the coil element.

5. A reactor according to claim 1, 4, wherein the projecting pieces project in a coil width direction perpendicular to the axial direction of the coil element when the reactor is viewed from above.

6. A reactor according to claim 1, wherein a groove width of the engaging groove on a side serving as an insertion opening for the projecting piece when the assembly is accommodated into the case is gradually widened toward the insertion opening.

7. A reactor according to claim 1, wherein the escaping portion is an escaping groove for allowing the projecting piece to escape.

8. A converter, comprising a reactor according to claim 1.

9. A power conversion device, comprising a converter according to claim 8.

* * * * *